«12» United States Patent
Spanke et al.

(10) Patent No.: US 6,877,372 B2
(45) Date of Patent: Apr. 12, 2005

(54) METHOD AND DEVICE FOR DETERMINING THE FILLING LEVEL OF A MEDIUM IN A CONTAINER

(75) Inventors: Dietmar Spanke, Steinen (DE); Robert Lalla, Lörrach (DE)

(73) Assignee: Endress + Hauser GmbH+Co. KG, Maulburg (DE)

( * ) Notice: Subject to any disclaimer, the term of this patent is extended or adjusted under 35 U.S.C. 154(b) by 0 days.

(21) Appl. No.: 10/275,968
(22) PCT Filed: May 9, 2001
(86) PCT No.: PCT/EP01/05258
  § 371 (c)(1),
  (2), (4) Date: May 12, 2003
(87) PCT Pub. No.: WO01/88489
  PCT Pub. Date: Nov. 22, 2001

(65) Prior Publication Data
  US 2003/0167838 A1 Sep. 11, 2003

(30) Foreign Application Priority Data
  May 17, 2000 (DE) .................. 100 24 353

(51) Int. Cl.$^7$ .................. G01F 23/00
(52) U.S. Cl. .................. 73/290 V; 73/290 R
(58) Field of Search .................. 73/290 V, 290 R, 73/301

(56) References Cited

U.S. PATENT DOCUMENTS 4,279,149 A * 7/1981 Block .................. 73/290 R
5,207,101 A   5/1993 Haynes .................. 73/597
5,449,493 A * 9/1995 Rokugawa et al. .................. 422/99
5,587,969 A  12/1996 Kroemer et al. .................. 367/99
5,760,309 A   6/1998 Maltby et al. .................. 73/646
5,987,994 A * 11/1999 Maltby et al. .................. 73/646
6,047,598 A * 4/2000 Otto et al. .................. 73/290 V
6,539,794 B1 * 4/2003 Otto et al. .................. 73/290 V

FOREIGN PATENT DOCUMENTS

DE   4234300 A1   4/1994
DE   4308373 C2   4/1995
DE   4405238 C2   7/1998

* cited by examiner

Primary Examiner—Hezron Williams
Assistant Examiner—Rodney Frank
(74) Attorney, Agent, or Firm—Bacon & Thomas, PLLC

(57) ABSTRACT

The invention relates to a method for determining the filling level of a medium in a container. A mixer that has at least one mixer blade and a mixer frequency ($f_R$) is disposed in the container. Measuring signals are emitted at a predetermined measuring frequency ($f_M$) towards the medium. The measuring signals reflected on the surface of the medium are received and evaluated by a runtime method. The aim of the invention is to provide a device which allows for a reliable measurement of the filling level of a medium in a container provided with a mixer. To this end, the measuring frequency ($f_M$) of the measuring signal having the mixer frequency ($f_R$) of the mixer is synchronized ($f_M = n\, f_R$ with n ∈ N) and that the measuring frequency ($f_M$) is shifted by a defined phase (?) with respect to the mixer frequency ($f_R$).

4 Claims, 4 Drawing Sheets

METHOD AND DEVICE FOR DETERMINING THE FILLING LEVEL OF A MEDIUM IN A CONTAINER

FIELD OF THE INVENTION

The invention relates to a method for determining the filling level, or fill level, of a medium in a container, in which a mixer which rotates at a certain stirring frequency is disposed in the container, and measurement signals at a predetermined measuring frequency are transmitted in the direction of the medium, the measurement signals are reflected from the surface of the medium and are received and evaluated via a transit time method. The invention also relates to several variant devices for performing the method of the invention.

BACKGROUND OF INVENTION

Major problems in measuring the fill level in containers by transit time methods can occur when a mixer that rotates at a certain stirring frequency is disposed in the container. If in fact the measuring frequency and the stirring frequency are in synchronous, then there is the risk that for measuring the fill level, instead of the spacing of the measuring instrument from the surface of the product in the container, the spacing from the mixer blades of the mixer will be measured and then used for evaluation.

SUMMARY OF THE INVENTION

It is the object of the present invention to overcome this disadvantageous situation and to provide a method that permits reliable measurement of the fill level of a medium in a container with a mixer.

This object is attained in that the measuring frequency fM of the measurement signals is synchronized with the stirring frequency $f_R$ of the mixer—that is, $f_M = n \cdot f_R$, where n ∈N applies—, and that the measuring frequency $f_M$ is displaced by a certain phase φ relative to the stirring frequency $f_R$. Thus the method of the invention reliably precludes the spacing of the measuring instrument from the mixer from being used via the transit time method instead of the spacing of the measuring instrument from the surface of medium.

In an advantageous refinement of the method of the invention, it is provided that the phase φ is dimensioned such that the measurement instant is outside the time range within which the mixer sweeps over the measurement site, and the measurement site defines the region within which the measurement signals meet the surface of the medium. That is, care must in particular be taken here to assure that the phase is less than the angular spacing of the individual mixer blades of the mixer—in the event that the mixer has multiple mixer blades.

Possible alternative features of the method of the invention provide that the applicable stirring frequency $f_R$ is determined by means of an optical, mechanical, or electrical method. Optically, the determination is done in a known manner by way of the different reflection behavior of different materials that are disposed at a rotating part of the mixer, preferably in the region of the shaft. Mechanically, the frequency determination can be done with the aid of a nipple that is secured to the pivot shaft of the mixer and that actuates a switch upon each revolution. To determine the stirring frequency electrically, the output or input voltage signal of the mixer is picked up.

While in the features described above the stirring frequency is measured using suitable additional apparatuses, an alternative embodiment of the method of the invention provides that the stirring frequency $f_R$ is determined from the measurement signals reflected from the surface of the medium or from the mixer, and thus is derived quasi-directly from the measurement signals. To assure that the measurement signals will be reflected not from the mixer blades but from the surface of the product, corresponding phase displacement is then effected between the stirring frequency and the measuring frequency, or in other words, the frequency at which the measurement signals are transmitted in the direction of the surface of the medium.

According to the invention, the object is also attained by providing that the measurement signals are transmitted at a constant measuring frequency $f_M$, and that from the beat frequency $f_S = f_R - f_M$ of the measuring frequency $f_M$ and stirring frequency $f_R$, the stirring frequency $f_R$ is determined; next, again in a preferred feature, the measuring frequency $f_M$ is displaced relative to the stirring frequency $f_R$ by a certain phase φ. This precludes the unwanted situation according to which the measuring frequency and the stirring frequency are in synchronous—which as already noted would cause the measurement to be based on the spacing of the measuring instrument from a mixer blade rather than on the spacing of the measuring instrument from the surface of the medium.

According to the invention, the object is moreover attained by the following method variant: the measuring frequency $f_M$ is variable; from the difference in the transit time of the measurement signals reflected from the surface or from the mixer, the fill level in the container is determined.

In a preferred feature of this last method, the measuring frequency $f_M$ of the measurement signals is defined via a random sequence.

An advantageous feature of a device that for performing the first method variant recited above, in which the stirring frequency is determined directly or indirectly and then a phase displacement between the stirring frequency and the measuring frequency is performed, has the following components: At least one mixer mechanism with a predetermined stirring frequency $f_R$ is disposed in the container; at least one transmitter unit is provided, which transmits measurement signals at a predetermined measuring frequency $f_M$ in the direction of the medium; a receiver unit is also provided, which receives the measurement signals reflected from the surface of the medium; a control/evaluation unit defines a phase displacement between the measuring frequency $f_M$ and the stirring frequency $f_R$ such that the measurement site, at which the measurement signals meet the surface of the medium, is located outside the angular region which at the same time is swept over by the at least one mixer blade of the mixer, and, from the transit time of the measurement signals, determines the fill level of the medium in the container.

A preferred embodiment of a device for performing the method variants of the invention in which the determination of the fill level is accomplished without additional aids is composed of the following system components: At least one mixer mechanism with a predetermined stirring frequency $f_R$ is disposed in the container; at least one transmitter unit is also provided, which transmits measurement signals at a constant or variable measuring frequency $f_M$ in the direction of the medium; a receiver unit receives the measurement signals reflected from the surface of the medium or from a mixer blade; and the control/evaluation unit, from the transit time of the reflected measurement signals, determines the fill level of the medium in the container.

In a preferred feature of the various variant devices for performing the method variants of the invention, the measurement signals are ultrasound waves or electromagnetic waves, in particular microwaves.

BRIEF DESCRIPTION OF THE DRAWINGS

The invention will be described in further detail in conjunction with the accompanying drawings. Shown are.

DESCRIPTION OF THE PREFERRED EMBODIMENT

Figure 1:
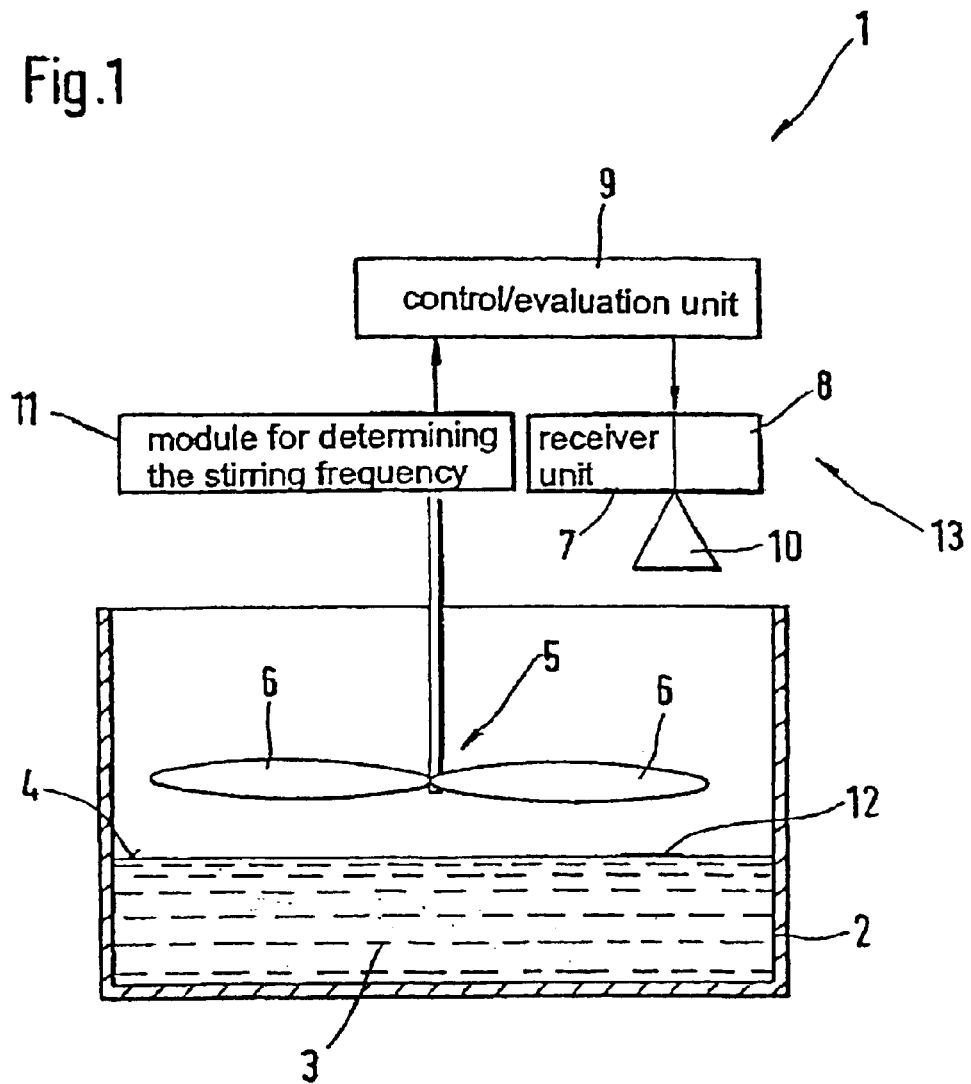
FIG. 1: which is a schematic illustration of a first device for performing a first variant of the method of the invention.

FIG. 1 is a schematic illustration of a first device 1 for performing a first variant of the method of the invention. In a container 2 with a mixer 5 that has two mixer blades 6, there is a medium 3. The fill level of the medium is determined by means of a measuring instrument 13 via the transit time of measurement signals. The measurement signals are generated by the signal generating and transmitting unit 7 and are transmitted in the direction of the medium 3 via the antenna 10. The measurement signals reflected from the surface 4 of the medium 3 are received by the antenna 10 and carried on into the receiver unit 8. The evaluation of the signals, finally, is done in the control/evaluation unit 9.

Transit time methods exploit the law of physics according to which the transit path is equal to the product of the transit time and the propagation speed. In the case of fill level measurement, the transit path is twice the distance between the antenna 10 and the surface 4 of the medium 3. As has been disclosed by European Patent Disclosure EP 0 955 527, for instance, the actual useful echo signal—that is, the portion of the measurement signal that is reflected from the surface—and its transit time are determined on the basis of the so-called echo function or the digital envelope curve; the envelope curve represents the amplitudes of the reflected measurement signals (--> echo signals) as a function of the spacing between the antenna and the surface of the medium. The fill level itself is then obtained from the difference between the known spacing of the antenna 10 from the bottom of the container 2 and the spacing, determined by the measurement, of the surface of the medium 3 from the antenna 10.

Figure 2:
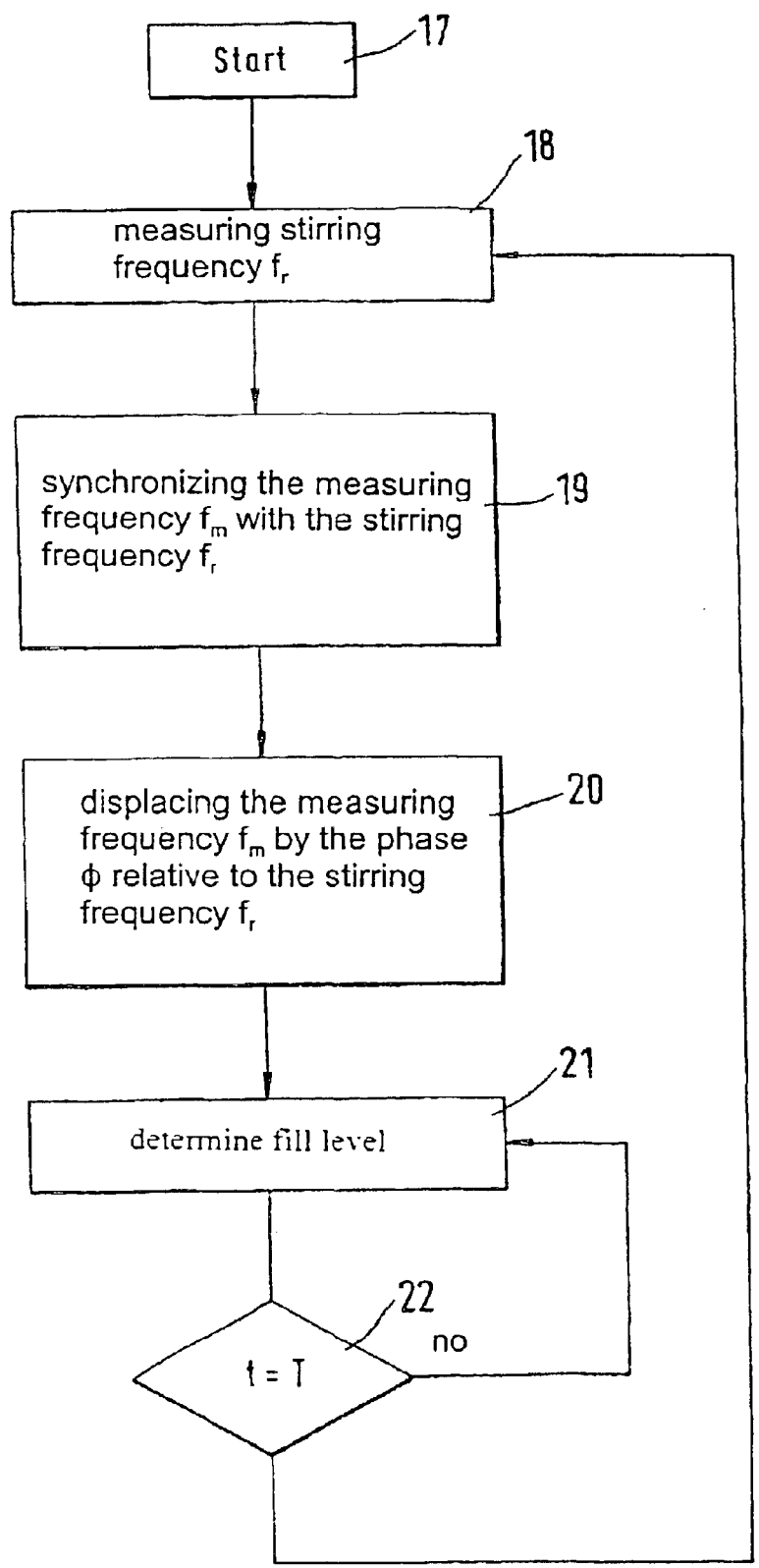
FIG. 2: which is a flowchart for triggering the control/evaluation unit shown in FIG. 1.

The control/evaluation unit 9 shown in FIG. 1 functions in accordance with a first variant of the method of the invention as illustrated in the flowchart of FIG. 2. After the start of the program at point 17, the stirring frequency is measured at point 18. The measurement is done either by means of an additional apparatus operating on an optical or mechanical basis, or by analysis of the input and output voltage of the mixer 5. At program point 19, the measuring frequency $f_M$ is synchronized with the stirring frequency $f_R$; next, at point 20, the measuring frequency $f_M$ is displaced by the phase φ relative to the stirring frequency $f_R$. The evaluation of the measurement signals reflected from the surface 4 of the medium 3 is done after that, at program point 21. This fill level determination is performed at predetermined time intervals t, until such time as the check at point 22 shows that a predetermined time T has elapsed. The program then jumps in a loop back to program point 18 and begins again to work through program points 18–22.

Figure 3:
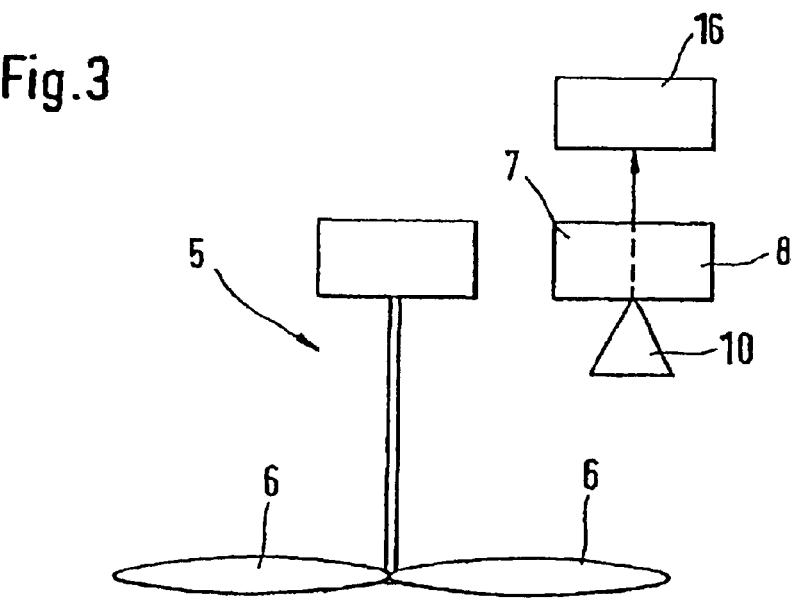
FIG. 3: which is a schematic illustration of a second device for performing a second variant of the method of the invention.

FIG. 3 is a schematic illustration of a second device 1 for performing a second variant of the method of the invention. As already described in conjunction with FIG. 1, in the container 2—which is not shown separately in FIG. 3—there are, besides the measuring instrument 13, comprising a signal generating and transmitting unit 7 and a receiver unit 8, a mixer 5 with two mixer blades 6. The measurement signals are transmitted in the direction of the medium at a known, periodic repetition rate, that is, at a fixed measuring frequency $f_M$. From the reflected measurement signals, the module 16 calculates the current stirring frequency $f_R$, via the beat frequency $f_S$, where $f_S=f_R-f_M$. Next—as in the case of the first device 1 described above for performing the method of the invention—the measuring frequency $f_M$ is again displaced by a phase φ relative to the indirectly ascertained stirring frequency $f_R$.

Figure 4:
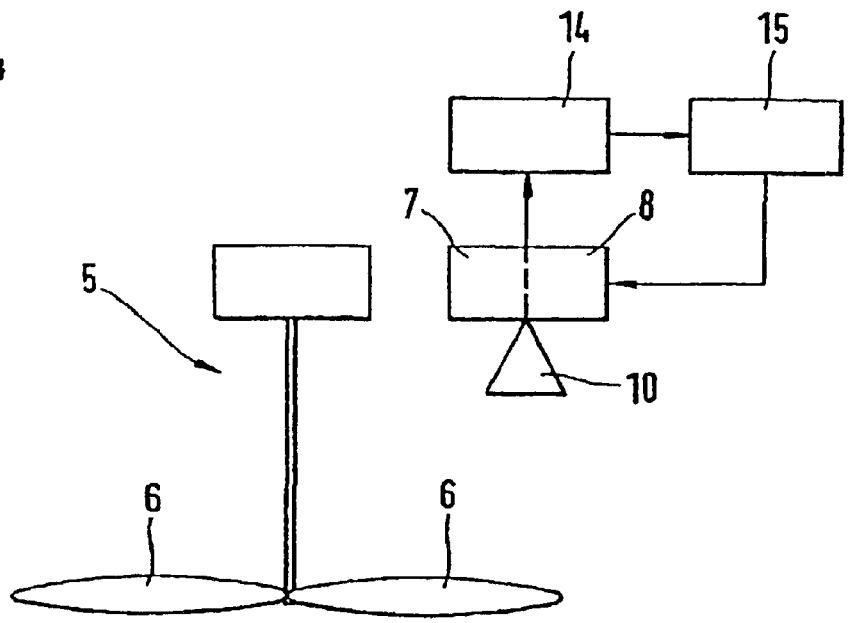
FIG. 4: which is a schematic illustration of a third device for performing a third variant of the method of the invention.

In FIG. 4, a schematic illustration of a third device 1 for performing a third variant of the method of the invention can be seen. For the components of the device 1 that have already been mentioned in conjunction with the two devices 1 described above, no description will be provided again here. The fill level determination is effected on the basis of a known repetition rate of the measurement signals, that is, a known measuring frequency $f_M$. From the reflected measurement signals, the stirring frequency $f_R$ and the phase between the measuring frequency $f_M$ and the stirring frequency $f_R$ are ascertained. Next, the measurement is done, with a suitably adapted repetition rate and a suitably adapted phase.

It is furthermore possible in this device 1 to replace the constant measuring frequency $f_M$ with a variable measuring frequency $f_M$. This reliably precludes the measurement signals from being permanently synchronous with the mixer blade 6 of the mixer 5. Since the measurement signals meet both the surface 4 of the medium and the surface of the mixer blade 6 of the mixer 5, the stirring frequency $f_R$ can be ascertained on the basis of the echo signals. This makes it possible not to use any of the echo signals reflected from the mixer blades 6 in determining the fill level.

Figure 5:
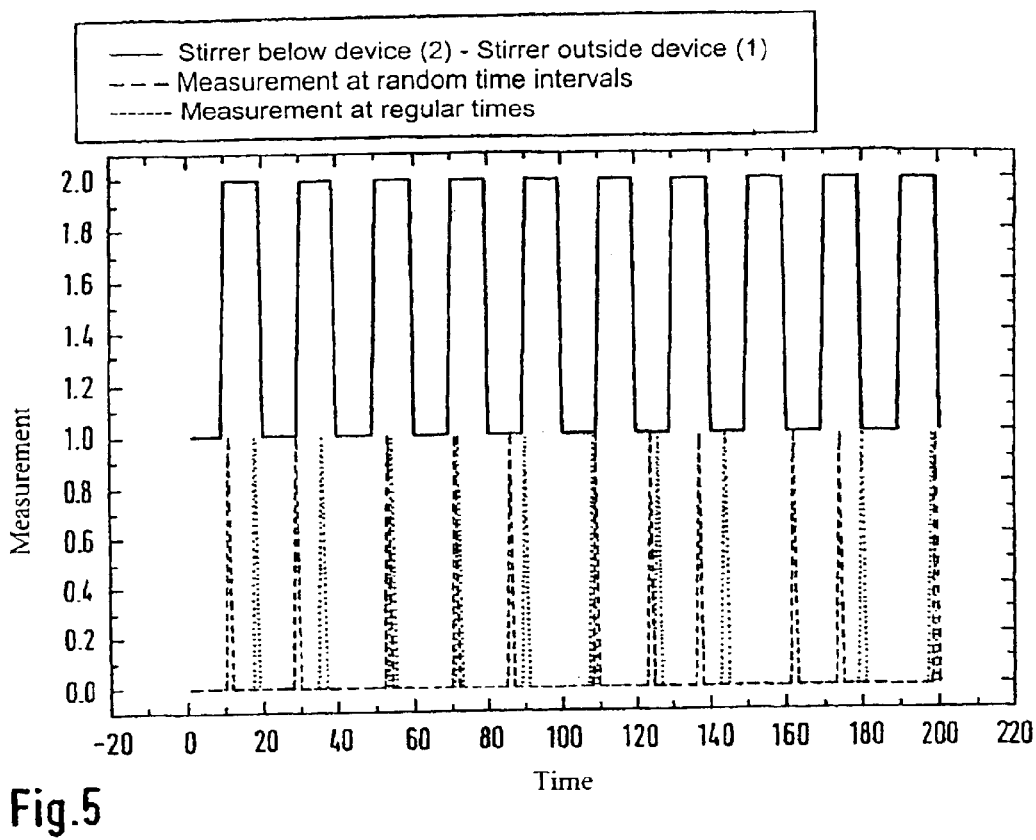
FIG. 5: which is a first graph showing the coincidences of the mixer and the measurement signals, when the measurement signals are transmitted are periodic or random time intervals.

FIG. 5 shows a first graph illustrating the coincidences of the mixer 5 and the measurement signals if the measurement signals are transmitted at periodic time intervals (dotted line) or at random time intervals (dashed line). The solid line represents the time ranges within which the mixer 5 or a mixer blade 6 of the mixer 5 is located at the measurement site 12 of the measuring instrument 13—in which case, on the ordinate the corresponding time ranges are each assigned the value 2—or in which the mixer 5 or a mixer blade 6 of the mixer 5 is located outside the measurement site 12 of the measuring instrument 13—in which case the value 1 is assigned to the corresponding time ranges on the ordinate.

Figure 6:
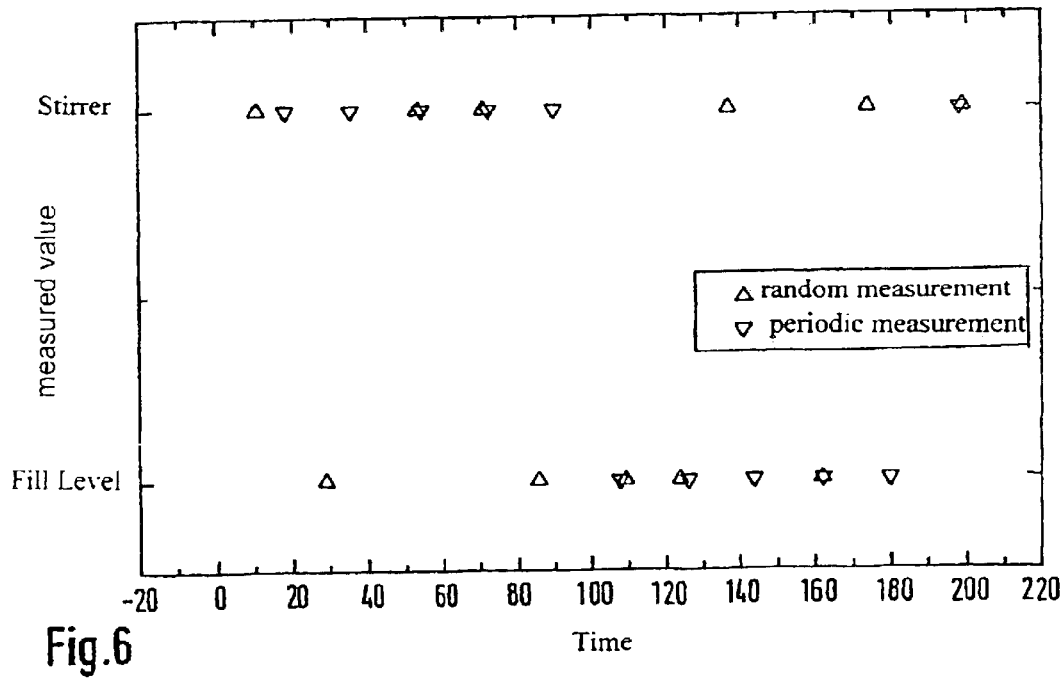
FIG. 6: which is a second graph showing the coincidences of the mixer and the measurement signals, when the measurement signals are transmitted are periodic or random time intervals.

FIG. 6 shows a first graph illustrating the coincidences of the mixer 5 and the measurement signals if the measurement signals are transmitted at periodic time intervals or random time intervals. Once again, at certain instants, the measurement signals meet the mixer 5 or a mixer blade 6 of the mixer 5, while at other instants they meet the surface of the medium. From the data, it can be seen quite clearly which measurement signals have been reflected from the uniformly rotating mixer 5 and which have been reflected from the surface of the medium 3. From the transit time of the measurement signals reflected from the surface 4 of the medium 3, the fill level of the medium 3 in the container 2 is then ascertained in a known manner.

What is claimed is:

1. A method for determining the fill level of a medium in a container, in which a mixer with a certain stirring frequency is disposed comprising the steps of:
   transmitting measurements signals at a predetermined measuring frequency in the direction of the medium;
   receiving the measurement signals reflected from the surface of the medium and evaluating the measurement signals reflected from the surface of the medium via a transit time method;
   synchronizing the measuring frequency ($f_M$) of the measurement signals with the stirring frequency ($f_R$) of the mixer ($f_M = n \cdot f_R$ where $n \in N$); and
   displacing the measuring frequency ($f_M$) by a certain phase ($\phi$) relative to the stirring frequency ($f_R$).

2. The method of claim 1, wherein a measurement site is defined as the region within which the measurement signals meet the surface of the medium, the method further comprising the step of:
   demensioning the phase ($\phi$) such that the measurement instant is outside the time range within which the mixer sweeps over the measurement site.

3. The method of claim 1, wherein, the applicable stirring frequency ($f_R$) is determined by means of one of: an optical, mechanical, and electrical method.

4. The method of claim 1, wherein, the stirring frequency ($f_R$) is determined from the measurement signals reflected from the surface of the medium or from the mixer.

* * * * *